United States Patent [19]

Kocol et al.

[11] 4,319,356
[45] Mar. 9, 1982

[54] SELF-CORRECTING MEMORY SYSTEM

[75] Inventors: James E. Kocol; David B. Schuck, both of Escondido, Calif.

[73] Assignee: NCR Corporation, Dayton, Ohio

[21] Appl. No.: 105,185

[22] Filed: Dec. 19, 1979

[51] Int. Cl.³ .......................................... G06F 11/10
[52] U.S. Cl. ..................................... 371/38; 371/13
[58] Field of Search .................. 371/38, 13; 365/222, 365/201

[56] References Cited

U.S. PATENT DOCUMENTS

| | | | |
|---|---|---|---|
| 3,573,728 | 4/1971 | Kolankowsky | 371/38 |
| 3,989,894 | 11/1976 | Charransol et al. | 371/47 |
| 4,183,096 | 1/1980 | Cenker et al. | 365/222 |
| 4,216,541 | 8/1980 | Clover et al. | 371/38 |
| 4,255,808 | 3/1981 | Schaber | 371/38 |

Primary Examiner—David H. Malzahn
Attorney, Agent, or Firm—J. T. Cavender; Edward Dugas; Stephen F. Jewett

[57] ABSTRACT

A self-correcting memory system includes internal error detection and correction circuitry that periodically accesses each data word and a group of ECC check bits associated with each data word stored in the memory system. The error detection and correction circuitry includes an ECC checking circuit that receives the accessed data word, generates ECC bits, and compares those ECC bits to the group of ECC check bits associated with the data word. The resulting signal is used to correct any single bit in error, and to indicate the presence of a double bit error. A self-correct address counter is cascaded to a refresh address counter in the control circuitry of the memory system so that the accessing of each data word occurs during a refresh cycle of the memory system.

5 Claims, 5 Drawing Figures

SELF-CORRECTING MEMORY SYSTEM

BACKGROUND OF THE INVENTION

The present invention relates to data processing systems and, more particularly, to memories used in data processing systems.

Over the past several years, there has been a significant increase in the capability of data processing systems. This increase is due, to a large extent, to the availability of high density memories, that is, memories capable of storing large quantities of data in a relatively small amount of physical space.

Two types of errors are known to commonly affect the reliability of high density memories. One type of error is termed a "hard error". A hard error is attributable to a physical defect in the memory and can be permanently corrected only by removing and replacing the defective memory. Hard errors can be reduced and even substantially eliminated by stringent quality control measures during the manufacture of memory devices.

A second, more troublesome type of error is a "soft error". Soft errors are not due to any permanent physical defect and, consequently, cannot be eliminated by quality control measures. They have been attributed to any one of a number of causes, with the most recent studies indicating alpha particle radiation as the leading cause. Soft errors are completely unpredictable in occurrence, but they have been found to be more common in high density, dynamic memories, where an extremely small amount of charge represents the data stored in each cell of such memories.

There have been proposals to reduce soft errors in high density memories. One such proposal has been to provide protective coatings to certain parts of the memories or to change some of the materials used in packaging the memories. However, this approach substantially increases manufacturing costs.

In some instances, manufacturers of semiconductor chips have completely ignored the problems caused by soft errors, and have relied on the purchaser or user of the memories to design their own mechanisms for overcoming the problem. For example, the user can provide error correction code (ECC) circuitry on data buses or the like, so that as data is transferred from a memory to some other part or subsystem of a data processing system, a check may be made for any errors in the data bits, and a correction made if an error is detected. The provision of error correction circuitry external to the memory, however, increases the cost of manufacturing data processing systems. Furthermore, such circuitry relies on the external accessing of data before a correction is made. If a data word is accessed infrequently, it may be subject to one or more soft errors before it is checked for errors. When more than one soft error has occurred in the same data word, correction of such errors is difficult with current bit correction techniques.

Insofar as is known, there have been no proposals in the past to incorporate ECC circuitry within a memory system that operates periodically to reduce soft errors. U.S. Pat. No. 3,989,894, issued to Pierre Charransol, does show an error detection and correction circuit for use with a circulating or shift register-type memory. The error detection and correction circuit periodically compares bits in the circulating memory with the same or derived bits stored in an auxiliary memory. The comparison is made, however, in order to check for and correct a lack of synchronization, rather than check for and correct soft errors.

SUMMARY OF THE INVENTION

There is provided in accordance with the present invention a self-correcting memory system overcoming the problems associated with soft errors in a dynamic memory. More particularly, there is provided error detection and correction circuitry internal to a memory system so that the memory system automatically and periodically checks for and corrects bit errors in data words without relying on the data words to first be externally accessed.

In a memory system in accordance with the present invention, the internal error detection and correction circuitry forms part of the refresh function of the memory system, so that as a given block of data within the memory system is refreshed during a refresh cycle, a specific word within the block is addressed and supplied to the error detection and correction circuitry. The error detection and correction circuitry corrects any single bit error, and provides the corrected word for storage back into the memory system.

In the disclosed embodiment, there is provided a memory system having a dynamic memory with a first portion for storing data words and a second portion for storing groups of error correction code (ECC) check bits. One group of ECC check bits in the second memory portion is associated with each data word in the first memory portion. When the memory system enters into a refresh mode or cycle, a data word in the first memory portion is read out along with its corresponding group of ECC check bits in the second memory portion. ECC bits are generated from the data word and compared to the ECC check bits. The comparison yields a signal indicating if any error is present in the data word, and such signal is provided to bit correction circuitry for correcting any single bit errors. The data word, including any bit that has been corrected, is written back into memory.

As a result, data words are periodically checked in the memory for errors, independently of the reading of data words from the memory system by systems external to the memory system. Thus, there is no difficulty caused by soft errors going undetected for any appreciable period of time, as would be the case if error detection and correction were not done in an automatic and periodic fashion.

It is therefore an object of the present invention to provide an improved memory system.

It is another object of the present invention to provide a dynamic memory system having means for automatically self-correcting data words stored within the memory system.

It is yet another object of the present invention to provide an improved memory system overcoming difficulties associated with "soft errors".

Still another object of the present invention is to provide a memory system having self-correcting features associated with the refresh mode of the memory system.

These and other objects of the present invention will become more apparent when taken in conjunction with the following description and the attached drawings.

DESCRIPTION OF THE PREFERRED EMBODIMENT

Figure 1:
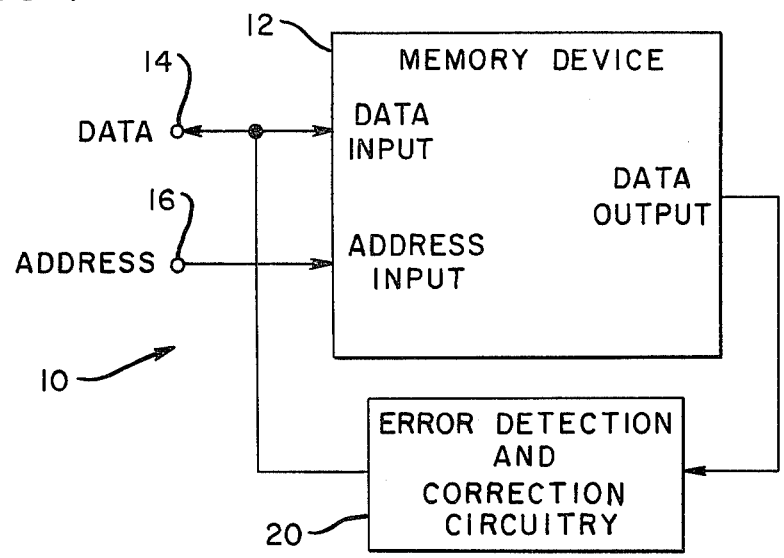
FIG. 1 is a block diagram of a memory system in accordance with the present invention.

Referring now to FIG. 1, there is shown in simplified form a self-correcting memory system 10 in accordance with the present invention. The memory system 10 is dynamic, that is, it has its stored data continually refreshed in order to maintain the stored data values. The memory system 10 includes a word addressable memory device 12.

The memory device 12 can have any one of a variety of forms. For example, in conventional dynamic memory systems, it would likely comprise a plurality of memory chips, with the chips arranged so that each chip provides one bit of a word being accessed. In addition, there would be both physical circuit elements within each memory chip for periodically refreshing the bits stored within the memory chip, and circuitry external to the memory chips for controlling the reading, writing and refreshing of data in the memory chips. Such circuit elements and circuitry are well-known in the art and, accordingly, are not shown in FIG. 1. For a complete description thereof, reference can be had to numerous publications, including, for example, J. Oliphant, *Memory System Design with the Intel 2107B 4K RAM*, in Memory Design Handbook 4-i (Intel Corporation 1977).

The memory system 10 also has a bidirectional data terminal 14 connected to an external bus (not shown) for either receiving data from a processor or other external system and providing that data to the data input of the memory device 12, or receiving data at the data output read from the memory device 12 and providing that data to the processor. An address terminal 16 receives address bits and provides the bits to the address input of the memory device 12 to identify the memory location from which data is to be read or into which data is to be written.

There is provided, in accordance with the present invention, error detection and correction circuitry 20 connected between the data output and the data input of the memory device 12. In its preferred form, the error detection and correction circuitry is connected so that it receives a data word read from the memory device 12 at the same time that the memory device is in a refresh operation or cycle. The error detection and correction circuitry 20 receives each data word stored in the memory device 12, checks for any errors in the bits of the data word, and corrects the data word if there is a bit error. The data word is then returned to the data input of memory device 12.

The use of the error detection and correction circuitry 20 during each refresh cycle is preferable since it assures that the checking for bit errors occurs at periodic and frequent intervals at a rate determined by the refresh cycle, without extensive additional circuitry or software. This will be more fully described later in conjunction with FIG. 2. However, it should be noted that within the scope of the present invention the error detection and correction circuitry 20 could be operated independently of the refresh cycle by, for example, causing the processor external to the memory system to periodically read each word from the memory so that it can be checked and corrected by the circuitry 20, and then write the word, with any corrected bits, back into the memory. It is preferable, of course, that this be done periodically and at frequent intervals so that single bit errors are corrected as they arise and before they can become double bit errors.

Figure 2:
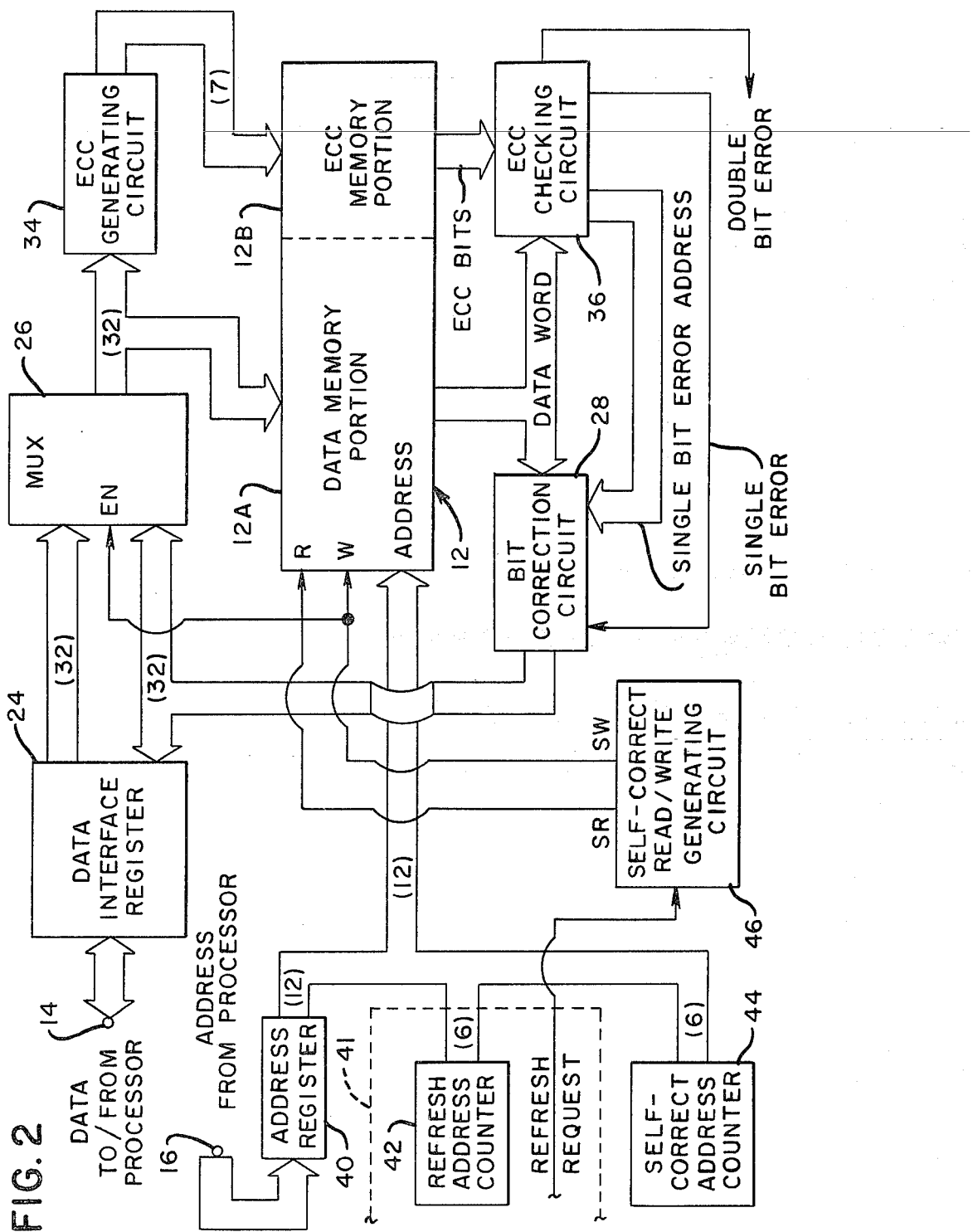
FIG. 2 is a detailed block diagram of the memory system of FIG. 1.

Turning now to FIG. 2, there is illustrated in greater detail the circuitry within the memory system 10 of FIG. 1. As can be seen, the memory device 12 is comprised of two memory portions, a data memory portion 12A and an ECC memory portion 12B. The data memory portion 12A holds the bits of each data word stored in the memory device 12, and the ECC memory portion 12B holds ECC check bits associated with each stored data word. If it is assumed that the data memory portion 12A stores data words each having thirty-two bits, then the ECC memory portion would need to store seven ECC bits for each data word if a conventional modified Hamming code were used.

The bi-directional data input 14 of the memory system 10 is connected to a data interface register 24. The data interface register 24 is bidirectional and receives data words at the data terminal 14 from a processor to be written into memory device 12. The data interface register 24 also receives data words that have been read from the memory device 12 and passes those data words to the data terminal 14 for use by the processor.

A multiplexer 26 controls the source of the data that is to be written into the memory device 12. Such data may come from a processor through the data interface register 24, as described above, or can come from the memory device 12 itself, by way of a bit correction circuit 28 when the memory system 10 is in a refresh mode or cycle.

Each word from the multiplexer 26 that is provided to the data input of memory device 12 is also provided to an ECC generating circuit 34. The ECC generating circuit 34 receives the data word and at its output provides ECC check bits to the ECC memory portion 12B of the memory device 12. Accordingly, for each data word received from the output of MUX 26 and stored in the data portion 12A of memory device 12, there is a corresponding group of ECC check bits stored in the ECC portion 12B of memory device 12.

The ECC generating circuit 34 can be a set of parity trees, i.e., a number of logic gates connected for logically combining the data bits in some predetermined fashion to generate each ECC check bit. Such a circuit is conventional, and for a detailed discussion of ECC circuits and the construction thereof, as well as one of many ECC codes suitable for use in the practice of the present invention, reference can be had to U.S. application Ser. No. 939,298, filed Sept. 1, 1978, by Wayne J. Lewis et al, now U.S. Pat. No. 4,201,337.

When a data word is to be read from memory device 12 for the purpose of checking for and correction of errors, the data word from data memory portion 12A and the corresponding ECC check bits from ECC memory portion 12B are provided to an ECC checking circuit 36. As will be more fully described later, the ECC checking circuit 36 receives each data word, generates ECC bits, and compares those ECC bits to the ECC check bits from the ECC memory portion 12B. The comparison of the ECC bits and ECC check bits results in a single bit error signal if a single bit error exists in the data word and a double bit error signal if a double bit error exists. If a single bit error has occurred, the ECC checking circuit also generates single bit error address signals indicating the bit position of any single bit error. The single bit address error signals and the single bit error signal are provided to the bit correction circuit 28, along with the data word from data memory portion 12A. The bit correction circuit 28 corrects any bit in error, and provides the entire data word, including the corrected bit, to the MUX 26. The bit correction circuit 28 includes a conventional connection of logic gates for correcting any single bit in error, such as described in the aforementioned U.S. application Ser. No. 939,298.

The bit correction circuit 28 is also connected to provide the data word, including any corrected bit, to the data interface register 24. If a data word is being read from memory device 12 by an external system, it will automatically be checked for errors, and the data interface register 24 provides the data word to terminal 14. If a data word is only being checked for errors and not being provided to an external system, MUX 26 passes the data word to the input of memory portion 12A and ECC check bits are again generated by the ECC generating circuit 34 and provided to the ECC memory portion 12B.

The memory system 10 in FIG. 2 further includes an address register 40 for receiving an address from, for example, a processor, when a data word is to be read from the memory device 12. The address register 40 provides that address to the address inputs of the memory device 12. If it is assumed that the memory device 12 is a 4K word memory, then, as indicated in FIG. 2, the address register 40 provides 12 bits to the memory device 12 in order to address each data word.

As described earlier with reference to FIG. 1, the memory system 10 includes conventional control circuitry, shown partially and designated 41 in FIG. 2. The control circuitry 41, for example, receives read and write requests from the processor and in response provides appropriate read and write control signals (not illustrated) to read control input R and write control input W of the memory device 12. The control circuit 41 also generates, from an internal oscillator (not shown), a periodic REFRESH REQUEST signal that periodically initiates a refresh operation in memory device 12. The circuitry within and the operations performed by the control circuit 41, as well as the control and sequencing signals delivered to the memory device 12, are well-known in the art, and reference can be had to the previously mentioned Intel Memory Design Handbook for a detailed discussion thereof. A single integrated circuit for performing all of the functions of the control circuit 41 could be, for example, circuit No. 3222, commercially available from Intel Corporation, Santa Clara, Calif.

In order to accomplish the necessary control of the memory device 12 during each refresh operation, the control circuit 41 includes, as conventional, a refresh address counter 42 that provides a number of bits to the address inputs of the memory device 12. If it is still assumed that memory device 12 stores 4K words, then refresh address counter 42 can provide six bits, as illustrated in FIG. 2, with those six bits addressing an entire block of data words in memory device 12 during each refresh operation. Each sequential count of the refresh address counter 42 is initiated by the REFRESH REQUEST signal and addresses the next block of data words in the memory device 12.

In order to cause a self-correct operation to be carried out during each refresh cycle in accordance with the present invention, there is provided a self-correct address counter 44 that augments the refresh address counter 42. Specifically, the self-correct address counter 44 provides six additional address bits to the memory device 12 during each refresh cycle so that in addition to the block of words addressed by the refresh address counter 42, a single data word within that block is also addressed. This addressed data word and its associated ECC check bits, are supplied to the ECC checking circuit 36 and bit correction circuit 28. The self-correct address counter 44 can be a conventional binary counter and can be cascaded to the refresh address counter 42 so that each data word in the memory system is periodically checked for errors.

During each refresh cycle, in order to read the addressed data word from memory device 12 and then write the data word, including any corrected bit, back into the memory device, it is necessary that a SELF-CORRECT READ (SR) signal and a SELF-CORRECT WRITE (SW) signal be delivered to the read and write control inputs of memory device 12. The SELF-CORRECT WRITE signal is also delivered to an enable input of the MUX 26 to pass the data word from the bit correction circuit 28 to the memory device 12.

To generate the SELF-CORRECT READ and SELF-CORRECT WRITE signals, there is shown in FIG. 2 a self-correct Read/Write Generating Circuit 46 for receiving the REFRESH REQUEST signal from the control circuit 41 and, in response, providing the SELF-CORRECT READ (SR) and SELF-CORRECT WRITE (SW) signals to the memory device 12.

Figure 3:
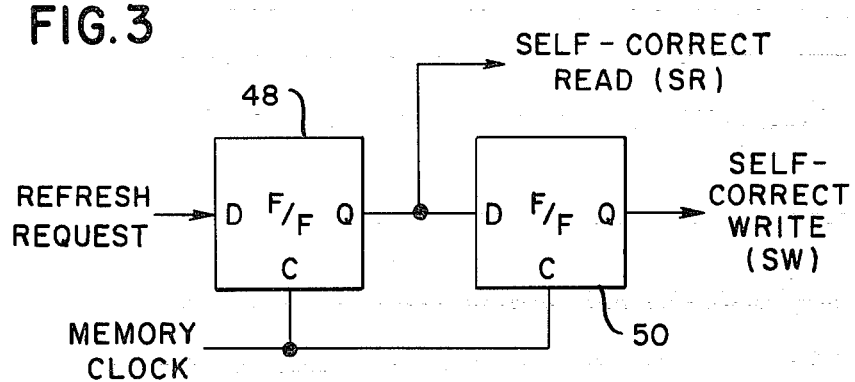
FIG. 3 is a detailed block diagram of the self-correct read/write generating circuit of FIG. 2.
Figure 4:
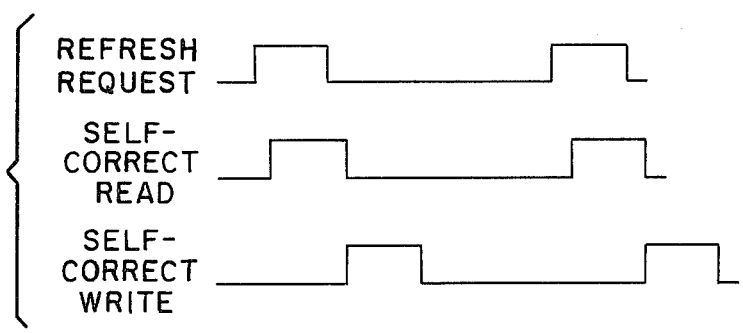
FIG. 4 is a waveform diagram illustrating the operation of the self-correct read/write generating circuit of FIG. 3.

FIG. 3 shows the self-correct Read/Write Generating circuit 46 as including two cascaded D-type flip-flops 48 and 50. The flip-flops are clocked by the clock signal of the memory. In response to each pulse in the REFRESH REQUEST signal, flip-flop 48 shortly later generates a pulse in the SELF-CORRECT READ signal. Shortly after that, the flip-flop 50 generates a pulse in the SELF-CORRECT WRITE signal. Waveforms illustrating the REFRESH REQUEST, SELF-CORRECT READ, and SELF-CORRECT WRITE signals are shown in FIG. 4.

During each refresh cycle, the six bits provided by the refresh address counter 42 causes, as is conventional, the refreshing of a block of data in memory device 12. The six bits provided by the self-correct address counter 44, in conjunction with the SELF-CORRECT READ signal, shortly later read one data word in that block to be checked for errors. Still later, but within the same refresh cycle, the SELF-CORRECT WRITE signal causes the data word, including any corrected bit, to be written back into memory device 12 by way of MUX 26.

Figure 5:
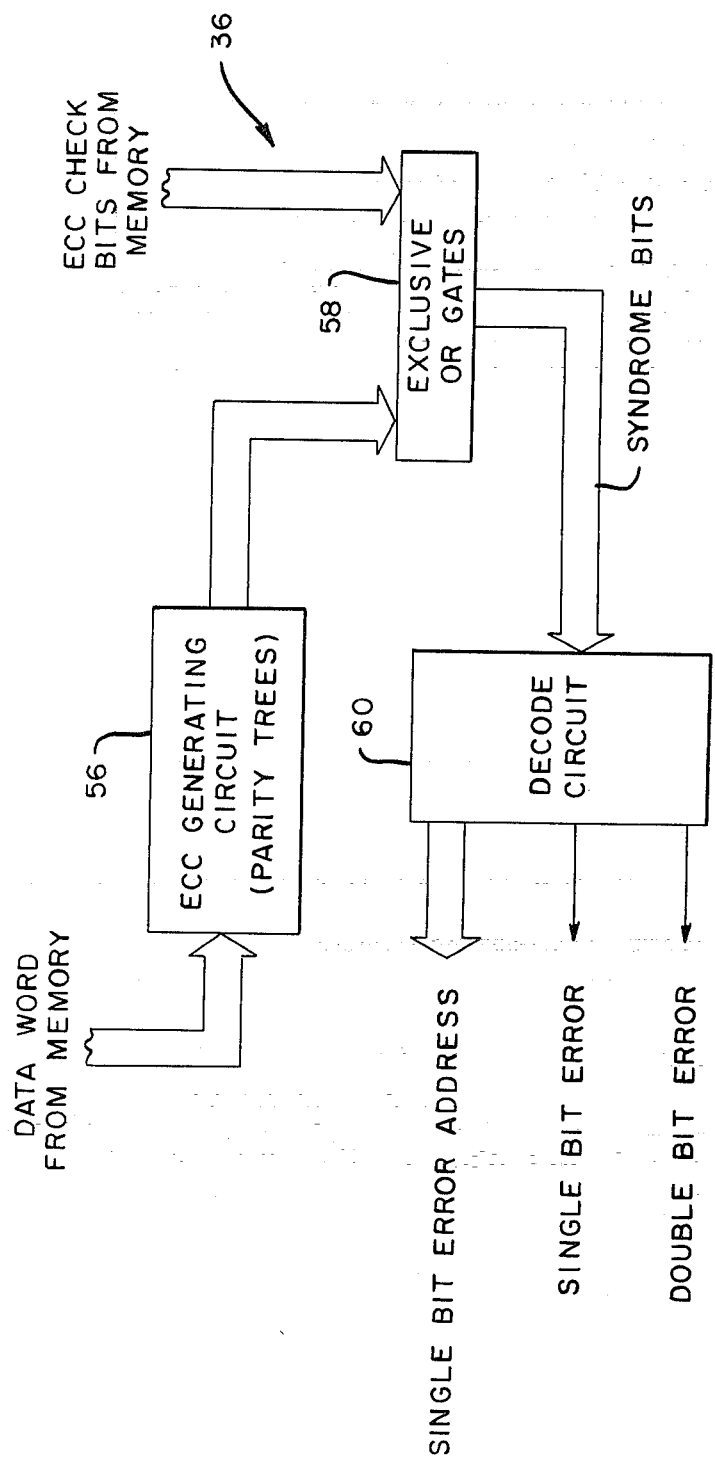
FIG. 5 is a detailed block diagram of the ECC checking circuit of FIG. 2.

FIG. 5 illustrates the ECC checking circuit 36 of FIG. 2. The ECC checking circuit includes an ECC Generating Circuit 56 which, like the ECC generate circuit 34 in FIG. 2, is comprised of parity trees for logically combining the bits of each data word and, in response, generating ECC bits. The ECC bits generated by the ECC generating circuit 56 are provided to Exclusive OR gates 58 along with the ECC check bits from the ECC memory portion 12B of the memory element 12. The comparison of the ECC bits from ECC generating circuit 56 and the ECC check bits from memory device 12 by the Exclusive OR gates 58 gives a set of syndrome bits. By evaluating the syndrome bits in a well-known manner, the presence of a double bit error can be made known, as well as the presence of a single bit error and the location of that single bit error. If the ECC bits from the ECC generating circuit and the ECC check bits from the memory are identical, then no error exists in the data word. A decode circuit 60 is provided for decoding the syndrome bits and providing the single bit error signal which will enable the bit correction circuit 28, the set of single bit error address signals which are provided to the bit correction circuit 28 for correcting the single bit of the data word in error, and a double bit error signal. The double bit error signal is generated if two bits in the word from memory have errors and, as conventional, such signal is provided directly to the processor.

The use of an ECC check circuit for detecting errors is well-known in the art, and for a more detailed discussion of such a circuit, including the use of parity trees and syndrome bits, reference can be had again to the aforementioned U.S. application Ser. No. 939,298.

It should be apparent from the foregoing description that by providing error detection and correction code circuitry in a memory system which operates in conjunction with the refresh circuitry of the memory system, there is provided an effective means for reducing the likelihood of uncorrectable soft errors in the memory system. Since the refresh circuitry operates on a continuous basis, the error detection and correction circuitry is continually and periodically checking each data word stored in the memory system, and if an error is noted, corrects that error before multiple errors in the data word can arise. Such a memory system does not need to rely on a specific word being externally accessed or read from the memory before the error checking and correcting can take place.

Although the presently preferred embodiment of this invention has been described, it will be understood that within the purview of this invention various changes may be made within the scope of the appended claims.

What is claimed is:

1. A memory system, comprising:
   a dynamic memory with a refresh cycle, said memory including a first memory portion for storing a plurality of data words and a second memory portion for storing groups of check bits, one group of check bits associated with each data word in said first memory portion;
   control circuitry for controlling the operation of said memory, including a refresh address counter for periodically supplying an address to said memory to refresh a block of the data words stored in said first memory portion; and
   error detection and correction means connected to said memory for periodically checking for and correcting any bit errors in each of the data words stored in said first memory portion, including a self-correct address counter augmenting said refresh address counter so that during each refresh cycle the address supplied to said memory defines a selected data word within the block refreshed, the selected data word being checked and corrected for any bit errors.

2. The memory system of claim 1, wherein said error detection and correction means further includes:
   first ECC generating means for receiving each data word to be stored in said first memory portion and generating a group of ECC check bits to be stored in said second memory portion; and
   ECC checking means for receiving such data word in said first memory portion and its associated group of ECC check bits in said second memory portion, said ECC checking means including second ECC generating means for generating a group of ECC bits in response to the received data word, and comparison means for comparing the ECC bits from said second ECC generating means and the ECC check bits from said second memory portion.

3. The memory system of claim 2, wherein said ECC checking means further includes means for generating a single bit error signal indicating any single bit error in the selected data word and the location of such single bit error in the selected data word, and wherein said error detection and correction means further includes bit correction means for receiving the selected data word and the single bit error signal and in response correcting the single bit error.

4. The memory system of claim 1, wherein said error detection and correction means further includes read/write signal generating means for generating a self-correct read signal to read the selected data word during each refresh cycle of said memory and a self-correct write signal to write the selected data word, including any corrected bit, back into said memory.

5. A memory system, comprising:
   a memory, including a first memory portion for storing a plurality of data words, and a second memory portion for storing groups of ECC check bits, one group of ECC check bits associated with each data word in said first memory portion;
   control circuitry for controlling the operation of said memory, including refresh address counter means for periodically supplying bits defining a block of data words in said first memory portion for being refreshed, said address bits being generated in response to a refresh request signal;
   first ECC generating means connected for receiving each data word to be stored in said first memory portion and in response generating a group of ECC check bits associated with the data word to be stored in said second memory portion;
   self-correct address counter means cascaded to said refresh address counter means to provide additional address bits for selected one data word in the block of data words being refreshed;
   self-correct read/write signal generating means connected to said memory, for generating a self-correct read signal to read the one selected data word and its associated group of check bits from said memory and generating a self-correct write signal for writing the one selected data word back into said memory;
   ECC checking means, including second ECC generating means connected for receiving the one selected data word from said first memory portion and in response generating ECC bits, Exclusive OR gate means connected for receiving and comparing the ECC check bits from said second memory portion associated with the one selected data word and the ECC bits generated by said second ECC generating means, and decode circuitry connected for receiving the output of said Exclusive OR gate means and in response generating a single bit error signal indicating the presence of a single bit error in the one selected data word; and
bit correction means connected for receiving the single bit error signal from said decode circuitry and the one selected data word from said first memory portion and in response correcting any single bit error in the one selected data word.

* * * * *